(12) United States Patent
Park et al.

(10) Patent No.: US 8,892,633 B2
(45) Date of Patent: Nov. 18, 2014

(54) APPARATUS AND METHOD FOR TRANSMITTING AND RECEIVING A USER INTERFACE IN A COMMUNICATION SYSTEM

(75) Inventors: Kyung-Mo Park, Seoul (KR); Jae-Yeon Song, Seoul (KR); Kook-Heui Lee, Suwon-si (KR); Seo-Young Hwang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 284 days.

(21) Appl. No.: 12/818,784

(22) Filed: Jun. 18, 2010

(65) Prior Publication Data

US 2010/0325203 A1    Dec. 23, 2010

(30) Foreign Application Priority Data

Jun. 19, 2009    (KR) .................. 10-2009-0055105

(51) Int. Cl.
*G06F 15/16*    (2006.01)
*G06F 9/44*    (2006.01)

(52) U.S. Cl.
CPC .................................. *G06F 9/4445* (2013.01)
USPC ........................................ 709/203; 709/200

(58) Field of Classification Search
USPC ......................................... 709/203, 226, 200
See application file for complete search history.

(56) References Cited

U.S. PATENT DOCUMENTS

| 5,327,529 | A | 7/1994 | Fults et al. |
| 5,673,403 | A | 9/1997 | Brown et al. |
| 6,212,564 | B1 | 4/2001 | Harter et al. |
| 6,225,984 | B1 | 5/2001 | Crawford |
| 6,300,947 | B1 | 10/2001 | Kanevsky |
| 7,136,842 | B2* | 11/2006 | Pirim ............................. 706/45 |
| 7,505,817 | B2* | 3/2009 | McDaniel et al. ............. 700/18 |
| 2007/0156894 | A1 | 7/2007 | Dees |
| 2008/0082604 | A1* | 4/2008 | Mansour et al. ............. 709/203 |
| 2012/0204115 | A1 | 8/2012 | Barrett |

FOREIGN PATENT DOCUMENTS

| CN | 1649411 | 8/2005 |
| CN | 1879355 | 12/2006 |
| EP | 1 434 127 | 6/2004 |
| EP | 1 551 153 | 7/2005 |
| JP | 7-160608 | 6/1995 |
| JP | 2000-066868 | 3/2000 |
| JP | 2003-280731 | 10/2003 |
| JP | 2005-064755 | 3/2005 |
| WO | WO 92/05498 | 4/1992 |
| WO | WO 2005/048537 | 5/2005 |

* cited by examiner

*Primary Examiner* — El Hadji Sall
(74) *Attorney, Agent, or Firm* — The Farrell Law Firm, P.C.

(57) ABSTRACT

A method and apparatus for transmitting a User Interface (UI) to a client in a communication system supporting a Remote User Interface (RUI), in which a representation level of a UI requested by the client is determined, whether the representation level is available in a service provided to the client is determined, and a UI having an available representation level is provided to the client, according to the determination results.

8 Claims, 5 Drawing Sheets

| DEVICE ENVIRONMENT (H/W) | DEVICE ENVIRONMENT (H/W and S/W) | UI FUNCTIONALITY | UI PRESENTATION LEVEL | NETWORK PROTOCOL | USER SETTING | CONFIGURATION DATA CONNECTION |
|---|---|---|---|---|---|---|
| RESOLUTION 1920x1080 | SCROLL MOUSE (O) | HIGH PROFILE | FULL WIDGET | DLNA | ENGLISH | 1 (DEFAULT) |
| RESOLUTION 1920x1080 | SCROLL 4-WAY KEY (X) | MIDDLE PROFILE | SIMPLE WIDGET | HTTP | KOREAN | 2 |
| RESOLUTION 720x480 | SCROLL 4-WAY KEY (O) | MIDDLE PROFILE | SIMPLE WIDGET | DLNA | KOREAN | 3 |
| RESOLUTION 320x240 | SCROLL TOUCH SCREEN (X) | LOW PROFILE | ICON | IMS | ENGLISH | 4 |
| RESOLUTION 320x240 | SCROLL KEYPAD (O) | LOW PROFILE | ICON | IMS | ENGLISH | 5 |
| RESOLUTION 320x240 | SCROLL KEYPAD (X) | LOW PROFILE | ICON | IMS | KOREAN | 6 |

FIG.5

APPARATUS AND METHOD FOR TRANSMITTING AND RECEIVING A USER INTERFACE IN A COMMUNICATION SYSTEM

PRIORITY

This application claims priority under 35 U.S.C. §119(a) to an application filed in the Korean Intellectual Property Office on Jun. 19, 2009 and assigned Serial No. 10-2009-0055105, the entire disclosure of which is hereby incorporated by reference.

BACKGROUND OF THE INVENTION

1. Field of the Invention

The present invention relates generally to a communication system, and more particularly, to an apparatus and method for transmitting and receiving user interfaces in a communication system.

2. Description of the Related Art

With the rapid evolution of network technologies and multimedia technologies, various types of multimedia devices have been developed, and convergence among these multimedia devices has been accelerated. Frequently, different types of multimedia devices such as, for example, digital TVs, home theaters, computer devices, and video/audio devices, constitute a network exchanging multimedia data, or the multimedia devices control the interaction among each other to offer merged multimedia services.

Conventionally, remote control between the entities that are physically far away from each other is performed using a Remote User Interface (RUI). Specifically, a UI server provides a control UI to a UI client, and the UI client controls the UI server using the provided UT.

SUMMARY OF THE INVENTION

The present invention is designed to provide at least the advantages described below. Accordingly, an aspect of the present invention provides a UI apparatus and method in which a UI server processes a UI that is provided to a UI client to control a multimedia device.

Another aspect of the present invention provides a UI apparatus and method for newly configuring a UI, which is provided to a UI client, according to UI environments and characteristics, for control of a multimedia device.

In accordance with an aspect of the present invention, there is provided a method for transmitting a UI to a client, by a server in a communication system supporting an RUI. The method includes determining a representation level of a UI requested by the client; determining whether the representation level is available in a service provided to the client; and providing a UI having an available representation level to the client according to the determination results.

In accordance with another aspect of the present invention, there is provided a method for receiving a UI from a server, by a client in a communication system supporting an RUI. The method includes transmitting representation level information of a UI to the server, taking into account environments and characteristics of the client; and receiving a UI having a representation level that is determined in the server, based on the representation level information.

In accordance with another aspect of the present invention, there is provided an apparatus for transmitting a UI to a client, by a server of a communication system supporting an RUI. The apparatus includes a generator for determining a representation level of a UI requested by the client, determining whether the representation level is available in a service provided to the client, and generating a UI having an available representation level according to the determination results; and a provider for providing the generated UI to the client.

In accordance with another aspect of the present invention, there is provided an apparatus for receiving a UI from a server, by a client of a communication system supporting an RUI. The apparatus includes a transmitter for transmitting representation level information of a UI to the server taking into account environments and characteristics of the client; and a receiver for receiving a UI having a representation level that is determined in the server based on the representation level information.

BRIEF DESCRIPTION OF THE DRAWINGS

The above and other aspects, features, and advantages of certain embodiments of the present invention will be more apparent from the following description, when taken in conjunction with the accompanying drawings, in which:

FIG. 5 is a diagram illustrating an example of a UI configuration information previously configured in a UI server according to an embodiment of the present invention;

Throughout the drawings, the same drawing reference numerals will be understood to refer to the same elements, features, and structures.

DETAILED DESCRIPTION OF EMBODIMENTS OF THE INVENTION

Figure 1:
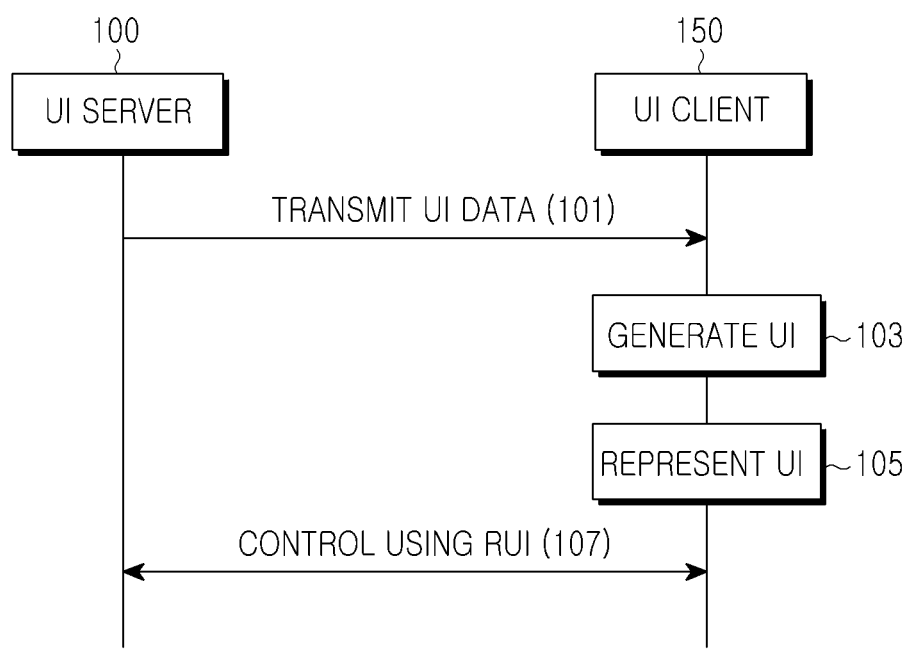
FIG. 1 is a flow diagram illustrating a UI transmission/reception method according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Among other things, the present invention provides a UI client that receives a UI having UI environments and characteristics from an external network or a multimedia device connected to an Internet Protocol (IP) network, or a UI server of a home network to which a multimedia device is connected.

The UI client receives UIs from the UI server, and performs various controls regarding searching for UIs and generation of new UIs through merging of multiple UIs. The UI client includes an input for controlling operations of the multimedia device, such as a remote controller with a keypad, a touch screen, a keypad, etc., and may be mounted in various terminals that can communicate with external devices, in the form of programs or chips. In this specification, the UI client may be broadly construed as an equivalent to the multimedia device or UI device.

Herein, a UI refers to a set of visual and/or auditory elements used to carry information for control of a multimedia device to a user, and also includes a set of elements providing device control through the UI. UI data refers to data included in a UI. For example, the UI may include animations, vector graphics, and multiple visual/auditory/tactile elements, and expressible functions/operations may be provided to the user through the animations, vector graphics, and multiple visual/auditory/tactile elements.

A UI event refers to an interaction between a UI client and a user, such as a touch input on a touch screen or a key input through a remote controller, which can be recognized in the UI client. For example, a widget includes UI elements such as expressive elements including windows, text boxes, weather elements, and virtual albums that are displayed on the multimedia device or UI device, and operating elements including execution, start, stop, deletion, addition, and conversion functions of application logics. The widget, also known as a gadget, may be located in a predetermined position on a display screen of the multimedia device or UI device.

Transmitting and receiving a UI between a UI client and a UI server may be generally divided into the following two methods.

First, if a UI server transmits UI data to a UI client, the UI client searches for other UI data that has been previously provided, using the received UI data, or merges the searched UI data with the received UI data, to generate a new UI suitable for its UI environments.

Second, if a UI server generates a UI based on a UI client's environmental and characteristic information and transmits it to the UI client, the UI client receives the UI in which its own environmental and characteristic information is taken into consideration. Accordingly, this method hierarchically organizes UIs provided by the UI server, taking various UI environments into account, and divides them into components of the widget, basic modules and extended modules for fast adaptation, thereby reducing complexity of procedures, calculations, and messages used during a UI data search/reception.

For example, the UI environments may include at least one of a type of a UI device equipped with a UI client, such as a terminal including a remote controller, a keypad and/or touch screen, and user attribute information such as user's UI use pattern/history, age, sex, and occupation.

FIG. 1 is a flow diagram illustrating a UI transmission/reception method according to an embodiment of the present invention.

Referring to FIG. 1, in step 101, the UI server 100 transmits UI data to the UI client 150. The UI data may also be provided from the UI server 100 to the UI client 150 via a multimedia device (not shown). The UI client 150 then provides the received UI data to a user, e.g., through a display thereof. The UI server 100 may transmit the UI data to the UI client 150, advertise the UI data, and may also remotely update the UI data provided to the UI client 150. The UI server 100 may use a common download method and/or streaming method for transmitting the UI data.

The UI data provided to the UI client 150 may be encoded in a multimedia data format according to, for example, the Moving Picture Experts Group (MPEG) standard. In this case, the UI data includes information about dynamic configuration of the UI. The MPEG standard, an international standard for compressing and encoding audio and video, includes various versions, such as MPEG-1, MPEG-2, MPEG-4, and MPEG-7. The UI server 100 encodes UI data using these MPEG standards.

Recently, most of the multimedia devices include an MPEG decoder capable of playing compressed video. Therefore, if the UI data is encoded based on the MPEG standard and then transmitted to different multimedia devices, most of the multimedia devices may represent (express) the UI without a separate browser.

The MPEG standard offers technologies related to scene representation by defining ISO/IEC 14496-11 and ISO/IEC 14496-20 technologies. The ISO/IEC 14496-11 includes MPEG-4 Binary Format for Scene (BIFS) technology, and the ISO/IEC 14496-20 includes Lightweight Applications Scene Representation (LASeR) technology. LASeR refers to a format of multimedia content, designed to enable mobile terminals to receive rich multimedia services. While the BIFS is the scene description standard for all types of multimedia content, the LASeR is the scene description standard for multimedia terminals having a small display size and also a small network bandwidth, like cell phones.

BIFS or LASeR is for object-based systems, and may encode UI data using an object-based video coding scheme. BIFS or LASeR includes information about scene description capable of representing temporal and spatial arrangement of objects included in images. Accordingly, the UI data may be encoded by representing the temporal and spatial arrangement of UI objects using a BIFS or LASeR scene description, regarding objects in the UI data as image objects encoded by BIFS or LASeR. In encoding UI data using an MPEG scene description method, the UI server 100 may include information about a UI's dynamic configuration in the UI data.

In accordance with an embodiment of the present invention, objects in UI data refer to a UI's minimum units invoking specific functions, based on a specific UI event that has occurred through interaction between the UI client and the user, such as a key input. Therefore, the UI client may represent temporal and spatial arrangement of a UI data's objects, such as buttons and menus, using BIFS or LASeR.

For example, when generating an MPEG-4 stream including UI images by encoding UI data using a video codec such as BIFS or LASeR, the UI client 150 may display the UI by simply receiving the MPEG stream including UI images that are encoded according to BIFS or LASeR and then decoding and playing the MPEG stream with an MPEG decoder. Because the UI can be displayed by merely playing the MPEG stream, a variety of devices with an MPEG decoder, like the multimedia devices, may display UIs provided by the UI server 100. The UI client 150, if it has the MPEG decoder, may also display UIs provided by the UI server 100 in the same manner.

Referring back to FIG. 1, if a UI is creating by representing an arrangement on an object basis using an object-based scene description method such as BIFS or LASeR, the UI client 150 that has received the UI data may generate and represent a new UI in steps 103 and 105, in which the UI device's environments have been dynamically taken into consideration through selection and rearrangement of objects. In step 107, various controls using the remote UI are performed between the UI client 150 and the UI server 100. The controls may include at least one of various controls related to use of multimedia content, such as a search for various information about the running content and selection/purchase of content, and control of an operation of a multimedia device (not shown in FIG. 1) intervening between the UI server 100 and the UI client 150.

Figure 2:
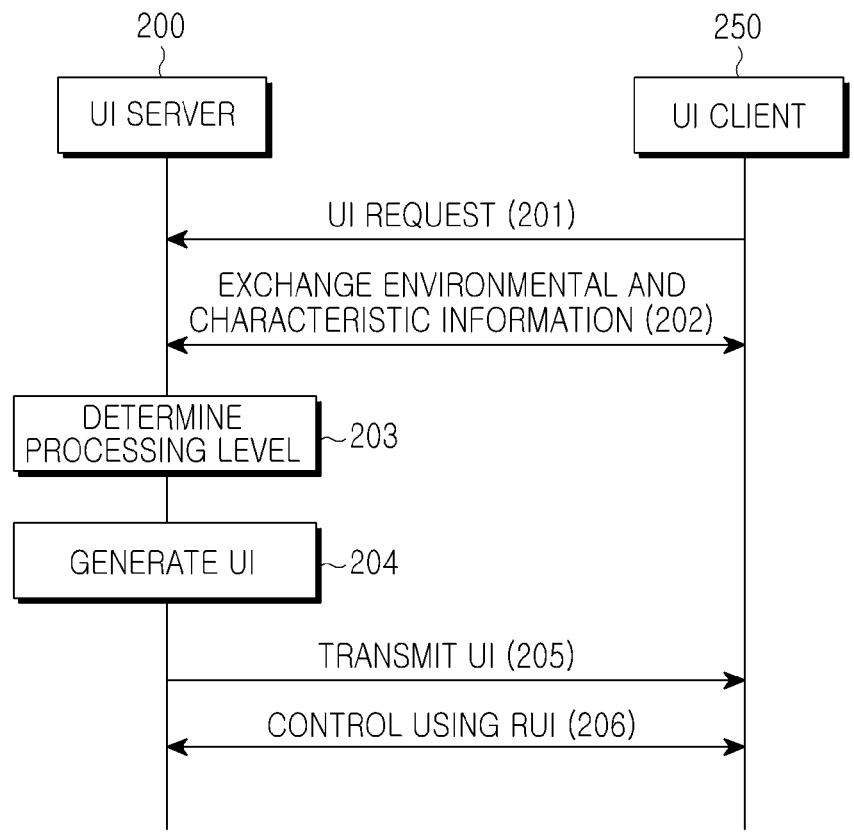
FIG. 2 is a flow diagram illustrating a UI transmission/reception method according to another embodiment of the present invention.

FIG. 2 is a flow diagram illustrating a UI transmission/reception method according to an embodiment of the present invention.

Referring to FIG. 2, a UI client 250 remotely accesses a UI server 200 to receive UI data. Though the UI client 250 is assumed to be a remote controller with a keypad, it may be applied to various terminals having a display for displaying UIs and an input, such as a keypad or a touch screen. The UI server 200 may include a server of a search site capable of searching for and transmitting widgets for UI services in the IP network, or a separate dedicated UI server providing UI services. That is, the UI client 250 and the UI server 200 may be all types of network devices connected to a specific network. The UI server 200 according to an embodiment of the present invention uses UI configuration information 310 and UI configuration data 320 or 410 configured by a container method to generate UIs as illustrated in FIGS. 3 and 4.

Figure 3:
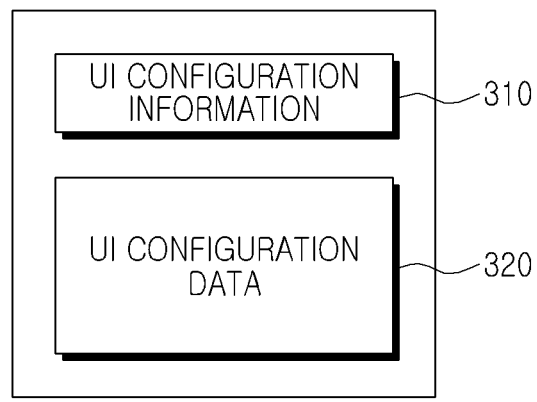
FIGS. 3 and 4 are diagrams illustrating structures of encoded UIs according to an embodiment of the present invention.
Figure 4:
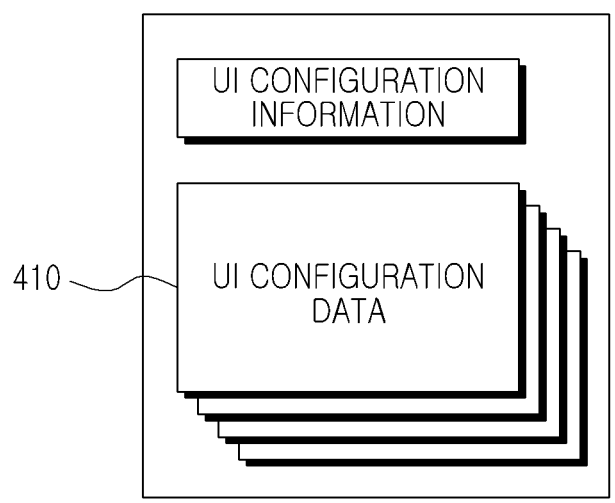

FIGS. 3 and 4 illustrate structures of encoded UIs.

As illustrated in FIG. 3, a UI is created using a container method, and includes UI configuration information 310 and UI configuration data 320.

In addition, as illustrated in FIG. 4, the UI configuration data 410 may include multiple pieces of data, and in some cases, components in the UI configuration data 410 may also be processed depending on a UI processing level.

Referring back to FIG. 2, the UI client 250 sends a UI request to the UI server 200 in step 201, and exchanges environmental and characteristic information with the UI server 200 in step 202.

More specifically, upon receiving the UI request from the UI client 250, the UI server 200 transmits to the UI client 250 the UI configuration information 310 that has been previously configured, as illustrated in FIGS. 3 and 4, such that the UI client 250 may select its environmental and characteristic information. Then the UI client 250 selects at least one of its environmental and characteristic information from the UI configuration information 310 received from the UI server 200, and transmits the selected information to the UI server 200.

The UI configuration information 310 may be configured as illustrated in FIG. 5.

FIG. 5 illustrates an example of the UI configuration information 310 that has been previously configured in the UI server 200, according to an embodiment of the present invention.

Referring to FIG. 5, the UI configuration information includes at least one of information about a device capability, a user preference, a UI representation level, and a functionality of the UI client 250, which can represent environmental and characteristic information of the UI client 250. The environmental and characteristic information of the UI client 250 may include information about the protocol that the UI client 250 uses to control the UI server 200 using UIs. That is, the environmental and characteristic information of the UI client 250 includes functional levels, such as structural and segmentation levels of UI's functions, and representation levels including an Icon, a Simplified (Simple Widget), and a Full (Full Widget), as level information provided by the UI. The environmental and characteristic information of the UI client 250 may be configured as illustrated in FIG. 5.

The UI representation level information may be included in a UI container. The information about the device capability of the UI client 250 may include the hardware capability such as a CPU, a memory, a display resolution, a battery level, and an input device's type of the UI client 250, and also the software environment's type information for representing UIs, such as storage/non-storage of UIs and scroll/non-scroll.

In order for the UI server 200 to receive UIs with, for example, the hardware and software capability of the UI client 250, the UI server 200 should know about the hardware and software capability of the UI client 250. The information about the user preference of the UI client 250 is information about the user of the UI client 250, that the UI server 200 provides UIs considering the preference, which is different depending on the user's age, sex, occupation, language, etc.

For a certain scenario where the UI client 250 sends a specific control message to the UI server 200 along with an up-stream and the UI server 200 is controlled according thereto, information about the protocol defined for exchange of a control message between the UI client 250 and the UI server 200 is shared. Therefore, in step 202, information about the protocol that the UI client 250 uses to control the UI server 200 using UIs is exchanged.

In step 203, the UI server 200 determines a processing level of UI data based on the environmental and characteristic information of the UI client 250, received from the UI client 250. More specifically, the UI server 200 combines the received environmental and characteristic information of the UI client 250 and determines a supportable processing level based on the UI configuration information 310.

For example, when a UI client (e.g., a digital TV) with English-speaking users using a resolution of 1920×1080 and a UI client (e.g., a mobile terminal) with a resolution of 320×240 attempt to use a weather widget in a Set-Top-Box (STB), the widget configuration information illustrated in FIG. 5 has been previously configured by a widget creator/provider in the weather widget located in the STB. The STB, which has collected the above environmental and characteristic information from UI clients, determines a UI processing level for UI delivery, and in this case, reconfigures UIs connected to an associated link according to the digital TV and the mobile terminal.

As another example, when in step 202, the UI server 200 transmits the UI configuration information illustrated in FIG. 5 to the UI client 250, and then receives, from the UI client 250, Resolution 1920×1080 in Device Environment, Simple Widget in UI Representation Level, and Korean in User Setting, as the environmental and characteristic information of the UI client 250, the UI server 200 combines the received Resolution 1920×1080 in Device Environment, Simple Widget in UI Representation Level, and Korean in User Setting, and determines a supportable processing level as a set corresponding to a configuration data connection 2 based on the UI configuration information.

If the UI server 200 cannot provide the set corresponding to the configuration data connection 2, the UI server 200 may determine a processing level, taking into account both the environmental and characteristic information of the UI client 250 and the environmental and characteristic information of the UI server 200.

Accordingly, in determining the processing level, the UI server 200 considers at least one of the UI configuration information, the environmental and characteristic information of the UI server 200, and the environmental and characteristic information of the UI client 250.

In step 204, the UI server 200 processes the UI data according to the determined processing level, and generates a UI by encoding the processed UI data in the format of the multimedia data. For example, the UI server 200 generates the UI using various versions of MPEG standards, such as the MPEG-1, MPEG-2, MPEG-4 and MPEG-7.

In step 205, the UI server 200 transmits the generated UI to the UI client 250. In this case, the UI server 200 transmits multimedia data for the UI to the UI client 250 in a streaming or downloading manner.

In step 206, the UI client 250 remotely controls the UI server 200 using the UI received in step 205. The UI client 250 plays the UI received from the UI server 200, displays it for the user, and exchanges a specific control message with the UI server 200 based on the input that the user has made in reply to the displayed UI. The control message may be a message for invoking a specific event.

Figure 6:
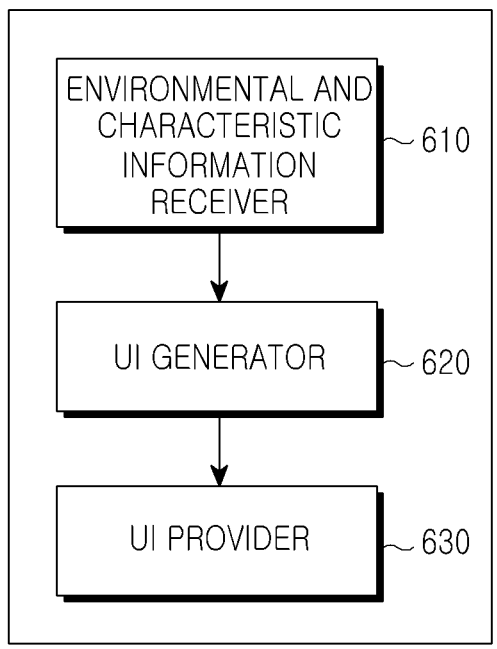
FIG. 6 is a block diagram illustrating a UI server according to an embodiment of the present invention.

FIG. 6 is a block diagram illustrating a UI server according to an embodiment of the present invention. Specifically, in FIG. 6, the UI server performs an operation, after it receives a UI request from a UI client and transmits the previously configured UI configuration information to the UT client.

Referring to FIG. 6, the UI server, which can be hardware or a combination of hardware and software, includes an environmental and characteristic information receiver 610, a UI generator 620, and a UI provider 630.

The environmental and characteristic information receiver 610 receives the environmental and characteristic information of the UI client from the UI client. The environmental and characteristic information of the UI client includes at least one of information about a device capability, a user preference, a UI representation level, and a functionality of the UI client, in the UI configuration information, and information about a protocol the UI client uses to control the UI server using UIs.

The UI generator 620 determines a UI's processing level based on the UI configuration information, the environmental and characteristic information of the UI server, and the received environmental and characteristic information of the UI client. The UI generator 620 processes UI data according to the determined processing level, and encodes it in the multimedia data format, generating a UI.

The UI provider 630 provides the generated UI to the UI client.

Figure 7:
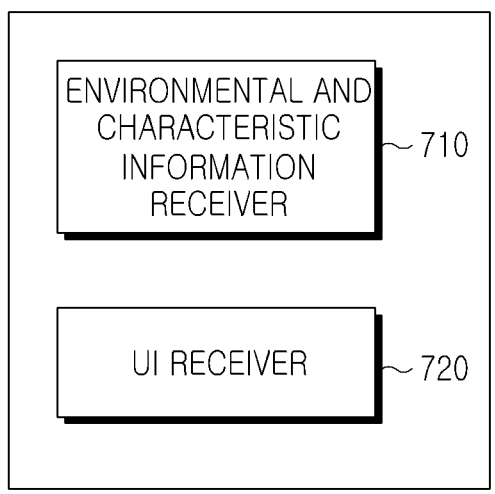
FIG. 7 is a block diagram illustrating a UI client according to an embodiment of the present invention.

FIG. 7 illustrates a UI client according to an embodiment of the present invention.

In FIG. 7, the UI client performs an operation, after it receives the UI configuration information for selecting the environmental and characteristic information of the UI client, from a UI server by sending a UI request to the UI server.

Referring to FIG. 7, the UI client, which can be hardware or a combination of hardware and software, includes an environmental and characteristic information transmitter 710 and a UI receiver 720.

The environmental and characteristic information transmitter 710 selects at least one of the environmental and characteristic information of the UI client based on the received UI configuration information, and transmits it to the UI server.

The UI receiver 720 receives from the UI server the UI that is generated based on the transmitted environmental and characteristic information of the UI client.

In accordance with an embodiment of the present invention, the UI client receives the UI that has been dynamically generated in consideration of its own environments and characteristics, and provides the UI suitable for controlling the UI server to the user, increasing user satisfaction.

As is apparent from the foregoing description, the various embodiments of the present invention can provide a method and apparatus in which a UI client may receive, from a UI server, a UI in which the UI client's device characteristics are taken into account, and control the UI server using the received UI.

In addition, according to an embodiment of the present invention, the UI client may receive the UI that is suited to the UI device considering its environments and characteristics, increasing user satisfaction.

Additionally, the UI client can receive an appropriate UI for controlling the UI server, enabling a UI session between one UI server and various UI client devices.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting a User Interface (UI) to a client by a server in a communication system supporting a Remote User Interface (RUI), the method comprising:
   receiving representation level information from the client;
   determining, from a plurality of representation levels, a representation level of a UI requested by the client based on the representation level information;
   determining whether the representation level is available in a service provided to the client; and
   providing a UI having an available representation level to the client, according to the determining results,
   wherein the plurality of representation levels comprises a simplified representation and a full representation, and
   wherein the representation level information is included in environmental and characteristic information comprising a functionality of the client and a protocol that the client uses to control the server.

2. The method of claim 1,
   wherein the environmental and characteristic information further comprises at least one of:
   a capability; and
   a user preference.

3. A method for receiving a User Interface (UI) from a server by a client in a communication system supporting a Remote User Client (RUI), the method comprising:
   transmitting representation level information of a UI to the server, taking into account environments and characteristics of the client; and
   receiving a UI having a representation level that is determined, from a plurality of representation levels, in the server, based on the representation level information,
   wherein the plurality of representation levels comprises a simplified representation and a full representation, and
   wherein the representation level information is included in environmental and characteristic information comprising a functionality of the client and a protocol that the client uses to control the server.

4. The method of claim 3,
   wherein the environmental and characteristic information further comprises at least one of:
   information about a capability; and
   a user preference.

5. An apparatus for transmitting a User Interface (UI) to a client in a server of a communication system supporting a Remote User Interface (RUI), the apparatus comprising:
   a receiver for receiving representation level information from the client;
   a generator for determining, from a plurality of representation levels, a representation level of a UI requested by the client based on the representation level information, determining whether the representation level is available in a service provided to the client, and generating a UI having an available representation level according to a determination result; and a provider for providing the generated UI to the client, wherein the plurality of representation levels comprises a simplified representation and a full representation, and wherein the representation level information is included in environmental and characteristic information comprising a functionality of the client and a protocol that the client uses to control the server.

6. The apparatus of claim 5, wherein the environmental and characteristic information further comprises at least one of:

a capability; and a user preference.

7. An apparatus for receiving a User Interface (UI) from a server in a client of a communication system supporting a Remote User Interface (RUI), the apparatus comprising:

a transmitter for transmitting representation level information of a UI to the server, taking into account environments and characteristics of the client; and a receiver for receiving a UI having a representation level that is determined, from a plurality of representation levels, in the server, based on the representation level information, wherein the plurality of representation levels comprises a simplified representation and a full representation, and wherein the representation level information is included in environmental and characteristic information comprising a functionality of the client and a protocol that the client uses to control the server.

8. The apparatus of claim 7, wherein the representation level information is included in environmental and characteristic information, and wherein the environmental and characteristic information further comprises at least one of:

information about a capability; and a user preference.

\* \* \* \* \*